United States Patent
Gao et al.

(10) Patent No.: US 12,547,883 B2
(45) Date of Patent: Feb. 10, 2026

(54) NEURAL NETWORK CIRCUIT AND NEURAL NETWORK SYSTEM

(71) Applicants: Huawei Technologies Co., Ltd., Shenzhen (CN); Tsinghua University, Beijing (CN)

(72) Inventors: Bin Gao, Beijing (CN); Qi Liu, Beijing (CN); Leibin Ni, Shenzhen (CN); Kanwen Wang, Shanghai (CN); Huaqiang Wu, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 798 days.

(21) Appl. No.: 17/882,360

(22) Filed: Aug. 5, 2022

(65) Prior Publication Data

US 2022/0374694 A1    Nov. 24, 2022

Related U.S. Application Data

(63) Continuation of application No. PCT/CN2021/075635, filed on Feb. 5, 2021.

(30) Foreign Application Priority Data

Feb. 7, 2020  (CN) .......................... 202010083080.7

(51) Int. Cl.
    *G06N 3/00* (2023.01)
    *G06N 3/063* (2023.01)

(52) U.S. Cl.
    CPC .................................. *G06N 3/063* (2013.01)

(58) Field of Classification Search
    None
    See application file for complete search history.

(56) References Cited

U.S. PATENT DOCUMENTS

| | | | |
|---|---|---|---|
| 5,093,803 A * | 3/1992 | Howard | G06N 3/065 708/801 |
| 6,396,329 B1 * | 5/2002 | Zerbe | G11C 7/1084 327/333 |

(Continued)

FOREIGN PATENT DOCUMENTS

| | | |
|---|---|---|
| CN | 105701541 A | 6/2016 |
| CN | 107612546 A | 1/2018 |

(Continued)

OTHER PUBLICATIONS

Delagnes et al., "A Low Power Multi-Channel Single Ramp ADC With Up to 3.2 GHZ Virtual Clock," IEEE Transactions on Nuclear Science, vol. 54, No. 5, pp. 1735-1742, Institute of Electrical and Electronics Engineers, New York, New York (Oct. 2007).

(Continued)

*Primary Examiner* — Shahid A Alam
(74) *Attorney, Agent, or Firm* — Leydig, Voit & Mayer, Ltd.

(57) ABSTRACT

A neural network circuit is described that includes a first sample-and-hold circuit, a reference voltage generation circuit, a first comparator circuit, and a first output circuit. The first sample-and-hold circuit generates a first analog voltage based on a first output current output by a first neural network computation array. The reference voltage generation circuit generates a reference voltage based on a first control signal. The first comparator circuit is connected to the first sample-and-hold circuit and the reference voltage generation circuit, and outputs a first level signal based on the first analog voltage and the reference voltage. The first output circuit samples the first level signal based on a second control signal, and outputs a first computation result that meets the first computation precision.

13 Claims, 12 Drawing Sheets

(56) References Cited

U.S. PATENT DOCUMENTS

| | | | |
|---|---|---|---|
| 9,860,965 B2* | 1/2018 | Recker | H05B 47/105 |
| 2017/0223807 A1* | 8/2017 | Recker | H05B 47/115 |
| 2017/0368682 A1 | 12/2017 | Danjo et al. | |
| 2018/0084627 A1* | 3/2018 | Recker | H05B 47/19 |
| 2018/0115442 A1* | 4/2018 | Tajalli | H04L 25/03267 |
| 2019/0182081 A1* | 6/2019 | Tajalli | H04L 25/03286 |
| 2020/0242461 A1* | 7/2020 | Tran | G11C 27/005 |
| 2021/0089875 A1* | 3/2021 | Tran | G06N 3/065 |
| 2021/0142156 A1* | 5/2021 | Tran | G06N 3/048 |
| 2021/0334639 A1* | 10/2021 | Tran | G06F 1/3203 |

FOREIGN PATENT DOCUMENTS

| | | |
|---|---|---|
| CN | 107742153 A | 2/2018 |
| CN | 109948786 A | 6/2019 |
| JP | 6569755 B1 | 9/2019 |
| WO | 2019097513 A1 | 5/2019 |

OTHER PUBLICATIONS

Mochida et al., "A 4M Synapses integrated Analog ReRAM based 66.5 TOPS/W Neural-Network Processor with Cell Current Controlled Writing and Flexible Network Architecture," 2018 Symposium on VLSI Technology Digest of Technical Papers, pp. 175-176, Institute of Electrical and Electronics Engineers, New York, New York (2018).

Kim et al., "An Ultra-Low-Power Analog-Digital Hybrid CNN Face Recognition Processor Integrated with a CIS for Always-on Mobile Devices," 2019 IEEE International Symposium on Circuits and Systems (ISCAS), Total 5 pages, Institute of Electrical and Electronics Engineers, New York, New York (May 2019).

Xue et al., "Embedded 1-Mb ReRAM-Based Computing-in-Memory Macro With Multibit Input and Weight for CNN-Based AI Edge Processors," IEEE Journal of Solid-State Circuits, vol. 55, No. 1, pp. 203-215, Institute of Electrical and Electronics Engineers, New York, New York (Jan. 2020).

Zhang et al., "Memristor-based Deep Convolution Neural Network: A Case Study," arXiv:1810.02225v1 [cs.NE], pp. 1-7 (Sep. 14, 2018).

Marinella et al., "Multiscale Co-Design Analysis of Energy, Latency, Area, and Accuracy of a ReRAM Analog Neural Training Accelerator," IEEE Journal on Emerging and Selected Topics in Circuits and Systems, vol. 8, No. 1, pp. 86-101, Institute of Electrical and Electronics Engineers, New York, New York (Mar. 2018).

\* cited by examiner $I_1 = V_1 * G_{1,1} + V_2 * G_{2,1} + V_3 * G_{3,1} + V_4 * G_{4,1}$

NEURAL NETWORK CIRCUIT AND NEURAL NETWORK SYSTEM

CROSS-REFERENCE TO RELATED APPLICATIONS

This application is a continuation of International Application No. PCT/CN2021/075635, filed on Feb. 5, 2021, which claims priority to Chinese Patent Application No. 202010083080.7, filed on Feb. 7, 2020. The disclosures of the aforementioned applications are hereby incorporated by reference in their entireties.

STATEMENT OF JOINT RESEARCH AGREEMENT

The subject matter and the claimed invention were made by or on the behalf of Tsinghua University, of Haidian District, Beijing, P.R. China and Huawei Technologies Co., Ltd., of Shenzhen, Guangdong Province, P.R. China, under a joint research agreement titled "NEURAL NETWORK CIRCUIT AND NEURAL NETWORK SYSTEM". The joint research agreement was in effect on or before the claimed invention was made, and that the claimed invention was made as a result of activities undertaken within the scope of the joint research agreement.

TECHNICAL FIELD

This application relates to the field of artificial intelligence, and specifically, to a neural network circuit and a neural network system.

BACKGROUND

A neural network is a tool to realize artificial intelligence and has characteristics such as a high computation amount and intensive memory access when processing input data. A method for improving processing efficiency of a neural network is to deploy the neural network by using an in-memory computing architecture. According to the method, a weight is written into a computing storage medium in advance based on a feature that the weight remains unchanged during computing of the neural network, and weight storage and computation are completed simultaneously. This can reduce consumption of time and energy caused by data exchange and computation.

In the in-memory computing architecture, a neural network computation array is a core module of a neural network circuit. A neural network computation array may also be referred to as a computation array. A multiply-add computation array constructed by a non-volatile storage medium usually includes several rows and columns. The row may also be referred to as a wordline, and the column may also be referred to as a bitline. An intersection of a row and a column is a computation storage cell of a computation array, or a cell for short. During computation of the neural network, a weight is stored in a cell in advance in a form of conductance. After being processed by a digital-to-analog converter (DAC), input data enters a computation array in a form of voltage. Subsequently, the voltage undergoes corresponding conductance to form currents and the currents converge on a same column. A sum of obtained currents may represent an accumulation result of products of the input data and the weight. The current further needs to be processed by an analog-to-digital converter (ADC) and restored to a digital signal.

The DAC and the ADC cannot adapt to changes in computation precision of the neural network due to their fixed precision. Consequently, the following problems are caused: In an existing neural network circuit, a computation precision requirement cannot be met in a case of low precision of, and a waste of power consumption is caused in a case of high precision.

SUMMARY

This application provides a neural network circuit and a neural network system, to adjust output precision of the neural network circuit based on computation precision of the neural network, so that the output precision of the neural network circuit adapts to a change of the computation precision of the neural network.

According to a first aspect, a neural network circuit is provided, including a first neural network computation array, a first sample-and-hold circuit, a reference voltage generation circuit, a first comparator circuit, and a first output circuit. The first neural network computation array includes a first group of computation units. The first group of computation units is configured to perform neural network computation on a first part of input data based on a weight, to obtain a first output current. The first sample-and-hold circuit is connected to the first group of computation units, and is configured to generate a first analog voltage based on the first output current. The reference voltage generation circuit is configured to generate a reference voltage based on a first control signal. The first control signal is determined based on first computation precision, and the first control signal varies with the first computation precision. The first comparator circuit is connected to the first sample-and-hold circuit and the reference voltage generation circuit, and is configured to output a first level signal based on the first analog voltage and the reference voltage. The first output circuit is configured to sample the first level signal based on a second control signal, and output a first computation result. The first computation result is a computation result that meets the first computation precision, and the second control signal is for controlling a frequency at which the first output circuit samples the first level signal.

When a value of the first output current changes, the first computation precision changes accordingly. For example, a larger first output current requires higher precision of the neural network. The neural network circuit may improve precision of the first computation result by increasing the sampling frequency of the first output circuit and extending duration of the first level signal, to meet the precision requirement of the neural network. This avoids the following problems: A computation precision requirement cannot be met in a case of low precision of an existing neural network, and a waste of power consumption is caused in a case of high precision.

Optionally, the neural network circuit further includes a parameter adjustment circuit, configured to generate the first control signal and the second control signal based on the first computation precision.

Optionally, when the first analog voltage is higher than the reference voltage, the first level signal is a high-level signal; and when the first analog voltage is lower than the reference voltage, the first level signal is a low-level signal.

Optionally, the first neural network computation array further includes a second group of computation units. The second group of computation units is configured to perform neural network computation on a second part of data based on a weight, to obtain a second output current. The neural network circuit further includes a second sample-and-hold circuit, a second comparator circuit, and a second output circuit. The second sample-and-hold circuit is connected to the second group of computation units, and is configured to generate a second analog voltage based on the second output current. The second comparator circuit is connected to the second sample-and-hold circuit and the reference voltage generation circuit, and is configured to output a second level signal based on the second analog voltage and the reference voltage. The second output circuit is configured to sample the second level signal based on the second control signal, and output a second computation result. The second computation result is a computation result that meets the first computation precision, and the second control signal is for controlling a frequency at which the second output circuit samples the second level signal.

A plurality of groups of computation units may share one parameter adjustment circuit and one reference voltage generation circuit. This reduces a quantity of components and power consumption.

Optionally, the neural network circuit further includes a second neural network computation array. The first output circuit is connected to an input end of the second neural network computation array, and the second neural network computation array is configured to compute, based on a weight, data input into the second neural network computation array. The data input into the second neural network computation array includes the first computation result, and the first computation result is a pulse signal.

When the first computation result is a pulse signal, the first computation result can be used by another computation array without conversion processing, and no components such as a register and a shift accumulator are required. This reduces a quantity of components and power consumption required for conversion processing.

Optionally, the reference voltage is a ramp voltage.

Optionally, an initial voltage of the reference voltage is controlled by the first control signal.

When the initial voltage of the ramp voltage equals an initial voltage of the first analog voltage, the first level signal (COMP_OUT) output by the first comparator circuit maintains a ReLU functional relationship with an input current (Current_IN) of the first sample-and-hold circuit, so that the first comparator circuit has a function of the ReLU function. Therefore, in this embodiment, the function of the ReLU function can be implemented without an additional component.

Optionally, the parameter adjustment circuit is further configured to generate a third control signal based on the first computation precision. The third control signal is for controlling a reference current of an operational amplifier OPA in the first sample-and-hold circuit, to control precision of the first analog voltage and power consumption of the first sample-and-hold circuit.

The OPA can operate under action of the control signal generated by the parameter adjustment circuit. The control signal is for controlling a reference current of the OPA, to reduce power consumption on a premise that a precision requirement of an output voltage of the first sample-and-hold circuit is met.

Optionally, the parameter adjustment circuit is further configured to control a sampling start time point of the first output circuit.

When the sampling start time point of the first output circuit does not shift, an output result of the first output circuit and an output current of the first sample-and-hold circuit present a normal ReLU functional relationship. When the sampling start time point of the first output circuit shifts, the output result of the first output circuit and the output current of the first sample-and-hold circuit present a bias ReLU functional relationship. Therefore, in this embodiment, a function of a normal ReLU function or a function of a biased ReLU function can be implemented without additional components.

According to a second aspect, a neural network system is provided, including: the neural network circuit according to any one of the first aspect and the implementations of the first aspect; a memory configured to store input data, and a processor, configured to read the input data from the memory, and input the input data into the neural network circuit, so that the neural network circuit performs neural network computation on the input data.

When a value of the first output current changes, the first computation precision changes accordingly. For example, a larger first output current requires higher precision of the neural network. The neural network circuit may improve precision of the first computation result by increasing the sampling frequency of the first output circuit and extending duration of the first level signal, to meet the precision requirement of the neural network. The neural network system including the neural network circuit can avoid the following problems: A computation precision requirement cannot be met in a case of low precision, and a waste of power consumption is caused in a case of high precision.

Optionally, the memory is further configured to store a computer program. The processor is further configured to invoke the computer program from the memory, to program a neural network computation array in the neural network circuit. The programming is for configuring a weight of the neural network.

DESCRIPTION OF EMBODIMENTS

To facilitate understanding of the technical solutions in this application, concepts in this application are first briefly described.

Figure 1:
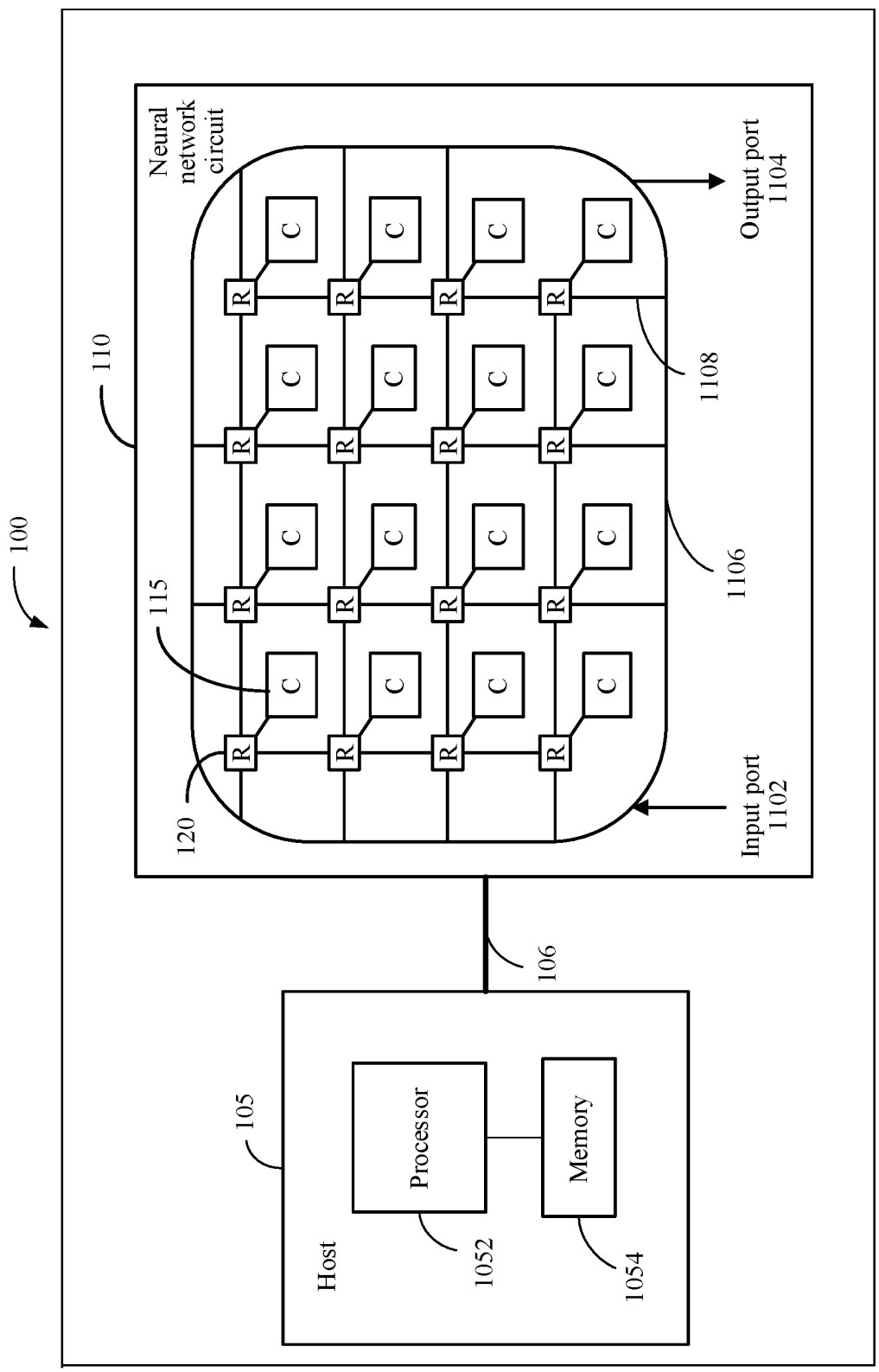
FIG. 1 is a schematic diagram of a structure of a neural network system according to this application.

An artificial neural network (ANN), referred to as a neural network (NN) or a neural-like network for short, is a mathematical model or a computational model that mimics a structure and function of a biological neural network (a central nervous system of an animal, especially a brain) in the field of machine learning and cognitive science, and is for function estimation or approximation. The artificial neural network may include neural networks such as a convolutional neural network (CNN), a deep neural network (DNN), and a multilayer perceptron (MLP). FIG. 1 is a schematic diagram of a structure of a neural network system according to an embodiment of the present invention. As shown in FIG. 1, the neural network system 100 may include a host 105 and a neural network circuit 110. The neural network circuit 110 is connected to the host 105 through a host interface. The host interface may include a standard host interface and a network interface. For example, the host interface may include a peripheral component interconnect express (PCIe) interface. As shown in FIG. 1, the neural network circuit 110 may be connected to the host 105 by using a PCIe bus 106. Therefore, data may be input to the neural network circuit 110 by using the PCIe bus 106, and data that is obtained through processing performed by the neural network circuit 110 is received by using the PCIe bus 106. In addition, the host 105 may monitor an operating status of the neural network circuit 110 through the host interface.

The host 105 may include a processor 1052 and a memory 1054. It should be noted that, in addition to the components shown in FIG. 1, the host 105 may further include other components such as a communication interface and a magnetic disk used as an external memory. This is not limited herein.

The processor 1052 is a computation core and control core of the host 105. The processor 1052 may include a plurality of processor cores. The processor 1052 may be a very large scale integrated circuit. An operating system and another software program are installed in the processor 1052, so that the processor 1052 can access the memory 1054, a cache, a magnetic disk, and a peripheral device (e.g., the neural network circuit in FIG. 1). It may be understood that, in this embodiment of the present invention, the core of the processor 1052 may be, for example, a central processing unit (CPU) or another application-specific integrated circuit (ASIC).

The memory 1054 is a main memory of the host 105. The memory 1054 is connected to the processor 1052 through a double data rate (DDR) bus. The memory 1054 is usually configured to store various software running in the operating system, input data and output data, information exchanged with an external memory, and the like. To increase an access speed of the processor 1052, the memory 1054 needs to have an advantage of a high access rate. In a conventional computer system architecture, a dynamic random access memory (DRAM) is usually used as the memory 1054. The processor 1052 can access the memory 1054 at a high speed by using a memory controller (not shown in FIG. 1), and perform a read operation and a write operation on any storage cell in the memory 1054.

The neural network circuit 110 is a chip array including a plurality of neural network chips. For example, as shown in FIG. 1, the neural network circuit 110 includes a plurality of neural network chips (chip, C) 115 for data processing and a plurality of routers (router, R) 120. For ease of description, the neural network chip 115 in this application is referred to as a chip 115 for short in this embodiment of the present invention. The plurality of chips 115 are connected to each other through the routers 120. For example, one chip 115 may be connected to one or more routers 120. The plurality of routers 120 may form one or more network topologies. Data transmission may be performed between the chips 115 by using the plurality of network topologies.

The neural network system 100 shown in FIG. 1 is an example of the neural network system provided in this application, and should not be construed as a limitation on the protection scope of this application. The neural network system applicable to this application may further include more circuits or fewer circuits. For example, the neural network chips may be directly connected without a router.

Figure 2:
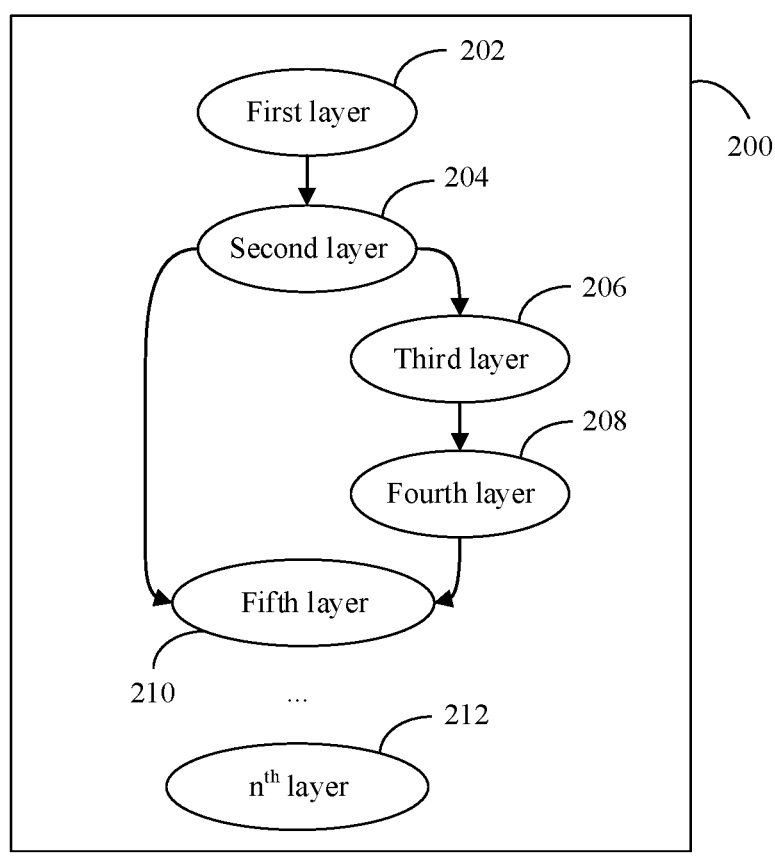
FIG. 2 is a schematic diagram of some neural network layers in a neural network according to this application.

A person skilled in the art may know that a neural network may include a plurality of neural network layers. In embodiments of the present invention, the neural network layer is a logical layer, and one neural network layer means that one neural network operation is to be performed. Computation of each neural network layer is implemented by a computing node. The neural network layer may include a convolutional layer, a pooling layer, and the like. As shown in FIG. 2, the neural network may include n neural network layers (which may also be referred to as n layers of neural networks), where n is an integer greater than or equal to 2.

FIG. 2 shows some neural network layers in the neural network. As shown in FIG. 2, the neural network 200 may include a first layer 202, a second layer 204, a third layer 206, a fourth layer 208, a fifth layer 210 to an $n^{th}$ layer 212. The first layer 202 may perform a convolution operation, the second layer 204 may perform a pooling operation on output data of the first layer 202, the third layer 206 may perform a convolution operation on output data of the second layer 204, the fourth layer 208 may perform a convolution operation on an output result of the third layer 206, the fifth layer 210 may perform a summation operation on the output data of the second layer 204 and output data of the fourth layer 208, and the like. It may be understood that FIG. 2 shows only a simple example of neural network layers in a neural network, and does not constitute a limitation on a specific operation of each neural network layer. For example, the fourth layer 208 may perform a pooling operation, and the fifth layer 210 may perform another neural network operation such as a convolution operation or a pooling operation.

In some neural networks, after computation of an $i^{th}$ layer in the neural network is completed, a computation result of the $i^{th}$ layer is temporarily stored in a preset cache. When computation of an (i+1)th layer is performed, a computation unit needs to load the computation result of the $i^{th}$ layer and a weight of the $(i+1)^{th}$ layer from the preset cache to perform computation. The $i^{th}$ layer is any layer in the neural network. In this embodiment of the present invention, the neural network circuit (for example a neural network chip C in FIG. 1) of the neural network system uses a computation array constructed by a non-volatile storage medium. Therefore, a weight may be configured on a cell of the computation array before computation. A computation result can be directly sent to a next layer for pipeline computation. Therefore, each neural network layer only needs to cache very little data. For example, each neural network layer needs to cache input data enough only for one time of window computing.

Figure 3:
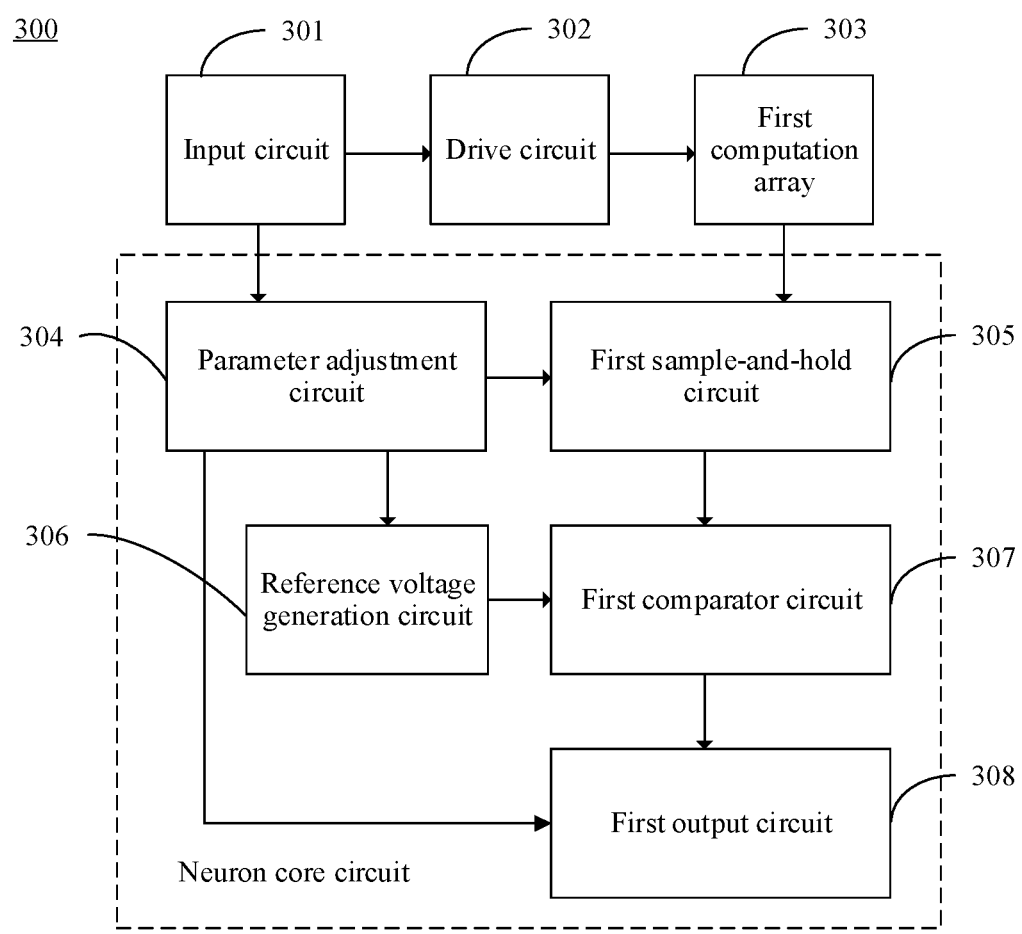
FIG. 3 is a schematic diagram of a structure of a neural network circuit according to this application.

FIG. 3 shows a neural network circuit including a computation array. The neural network circuit 300 includes: an input circuit 301, configured to store input data of a neural network, and send the input data to a drive circuit 302; the drive circuit 302, connected to the input circuit 301, and configured to convert the input data into a voltage signal that can be applied to a first computation array 303; the first computation array 303, connected to the drive circuit 302, and configured to generate an output current based on the voltage signal input by the drive circuit 302 and a pre-stored weight; a first sample-and-hold circuit 305, connected to a first group of computation units in the first computation array 303, and configured to generate a first analog voltage based on a first output current, where the first group of computation units may belong to one column of computation units, or may belong to a plurality of columns of computation units; a parameter adjustment circuit 304, connected to the input circuit 301 and the first sample-and-hold circuit 305, and configured to adjust a parameter of each circuit in the neural network circuit 300 based on a control signal, for example, a first control signal and a second control signal described below; a reference voltage generation circuit 306, connected to the parameter adjustment circuit 304, and configured to generate a reference voltage (for example, a ramp voltage) based on the first control signal, where the first control signal is determined based on first computation precision, and the first control signal varies with the first computation precision; a first comparator circuit 307, connected to the first sample-and-hold circuit 305 and the reference voltage generation circuit 306, and configured to output a first level signal based on the first analog voltage and the reference voltage; and a first output circuit 308, connected to the first comparator circuit 307 and the parameter adjustment circuit 304, and configured to sample the first level signal based on the second control signal and output a first computation result, where the first computation result is a computation result that meets the first computation precision, and the second control signal is for controlling a frequency at which the first output circuit 308 samples the first level signal.

A circuit in the neural network circuit 300 other than the input circuit 301, the drive circuit 302, and the first computation array 303 may be referred to as a neuron core circuit.

It should be noted that, in this application, division into the circuits is an example, and is merely a logical function division. In actual implementation, another division manner may be used. The foregoing circuits and a connection relationship between the circuits are examples rather than limitations. A person skilled in the art can reconstruct the neural network circuit 300 without creative efforts.

In some cases, one circuit may be integrated into another circuit, and the connection relationship changes accordingly. For example, the drive circuit 302 may be integrated into the input circuit 301; in this case, the first computation array 303 is connected to the input circuit 301. The first comparator circuit 307 may be integrated into the first sample-and-hold circuit 305; in this case, the first output circuit 308 and the reference voltage generation circuit 306 are separately connected to the first sample-and-hold circuit 305.

In other cases, some circuits may be removed. For example, the parameter adjustment circuit 304 may be removed, and another circuit in the neural network circuit 300 may operate based on a control signal input externally or information preset internally.

In addition, in this application, terms such as "first" and "second" are for indicating different individuals of a same type. For example, the first comparator circuit 307 and a second comparator circuit described below indicate two different comparator circuits. There is no other limitation on the terms.

The neural network circuit 300 may be a submodule of the neural network circuit 110 in the neural network system 100 shown in FIG. 1 (that is, the neural network circuit 300 is the neural network chip C in FIG. 1). When performing neural network computation, the neural network system 100 may first program the first computation array 303, that is, complete mapping from a weight of the neural network to a conductance value.

Subsequently, the input circuit 301 may send the input data to the drive circuit 302 through time division. 1-bit (bit) information is sent in each clock cycle. For example, if the input data is 10, the input circuit 301 may send 1 in 10 consecutive clock cycles, and send 0 in all clock cycles after the 10 consecutive clock cycles. This output method is called rate-coding.

The drive circuit 302 may convert 1 and 0 into voltage signals and load the voltage signals onto the first computation array 303. At the same time, the first sample-and-hold circuit 305 accumulates currents in time domain output by the first group of computation units in the first computation array 303 until the input data is input.

The first computation array 303 may operate simultaneously with the drive circuit 302. The following describes, with reference to FIG. 4, an operating process in which the first computation array 303 performs an operation based on the weight of the neural network and the input data.

A weight is usually for indicating importance of input data to output data. In a neural network, a weight is usually represented by using a matrix. As shown in Table 1, a matrix of j rows and k columns shown in Table 1 may be a weight of a neural network layer, and each element in the matrix represents one weight value.

TABLE 1

| $W_{0,0}$ | $W_{0,1}$ | * | * | * | $W_{0,k-1}$ |
|---|---|---|---|---|---|
| $W_{1,0}$ | $W_{1,1}$ | * | * | * | $W_{1,k-1}$ |
| $W_{2,0}$ | $W_{2,1}$ | * | * | * | $W_{2,k-1}$ |
| $W_{3,0}$ | $W_{3,1}$ | * | * | * | $W_{3,k-1}$ |
| * | * | * | * | * | * |
| * | * | * | * | * | * |
| * | * | * | * | * | * |
| $W_{j-1,0}$ | $W_{j-1,1}$ | * | * | * | $W_{j-1,k-1}$ |

In this embodiment, the weight may be configured on the first computation array in advance. For example, an element in a matrix is configured in a cell of a computation array, and one element is configured for each cell. In this way, a multiply-add operation can be performed on the input data and a matrix representing a weight by using the computation array.

Figure 4:
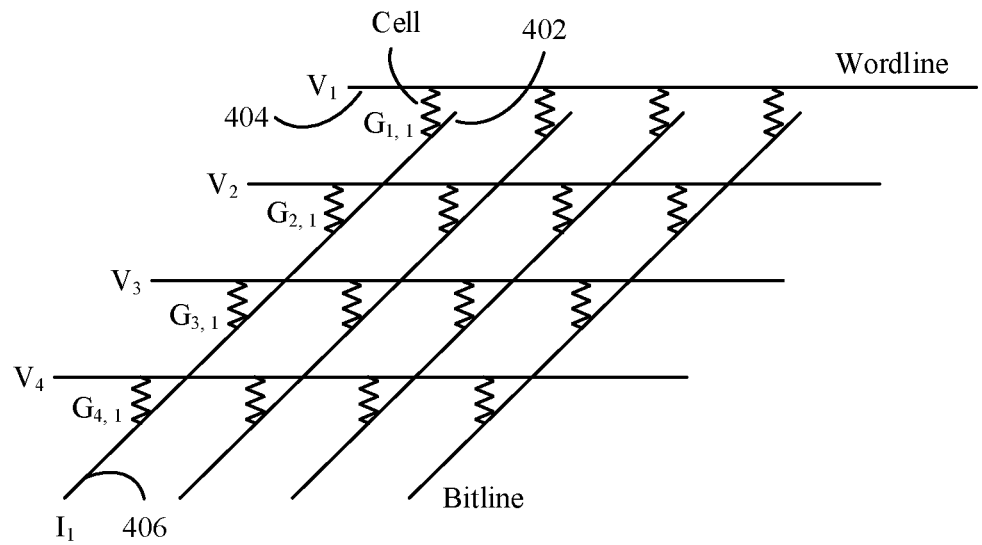
FIG. 4 is a schematic diagram of a structure of a computation array according to this application.

FIG. 4 shows a structure of a computation array. One computation array may include a plurality of cells, such as $G_{1,1}$ and $G_{2,1}$. Cells are located at row-column intersections. If one computation array includes 1000 rows and 1000 columns, there are one million cells in the computation array. In embodiments of the present invention, in a process of configuring a neural network, the weight shown in Table 1 may be input into the computation array through bitlines (an input port 402 in FIG. 4) of the computation array shown in FIG. 4, so that each weight value in the weight is configured into a corresponding cell. For example, the weight value $W_{0,0}$ in Table 1 is configured into $G_{1,1}$ in FIG. 4, and the weight value $W_{1,0}$ in Table 1 is configured into $G_{2,1}$ in FIG. 4. Each weight value corresponds to one cell, and each weight value is stored in the cell in a form of conductance. When the neural network computation is performed, input data is input into the computation array through wordlines (an input port 404 shown in FIG. 4) of the computation array. The input data can be represented by voltages (such as $V_1$, $V_2$, $V_3$, and $V_4$), so that a dot multiplication operation is performed between the input data and weight values stored in cells, and obtained computation results are output in a form of a current from an output end of each column (an output port 406 shown in FIG. 4) of the computation array.

A current value output in each column may be calculated according to Formula I=GV. For example, the current value output by the first column is denoted as $I_1$, $I_1=V_1*G_{1,1}+V_2*G_{2,1}+V_3*G_3+V_4*G_{4,1}$ A computation array in which a weight is stored may also be referred to as a synaptic array. The computation array shown in FIG. 4 is a 1T1R array. 1T1R means that each cell has one transmit end and one receive end. Optionally, a computation array applicable to this application may alternatively be a 1T2R array, a 2T2R array, or another type of array.

After the first sample-and-hold circuit 305 finishes processing the output current of the first computation array 303, the first comparator circuit 307 and the reference voltage generation circuit 306 start to operate. At the same time, the first output circuit 308 is also operating.

Figure 5:
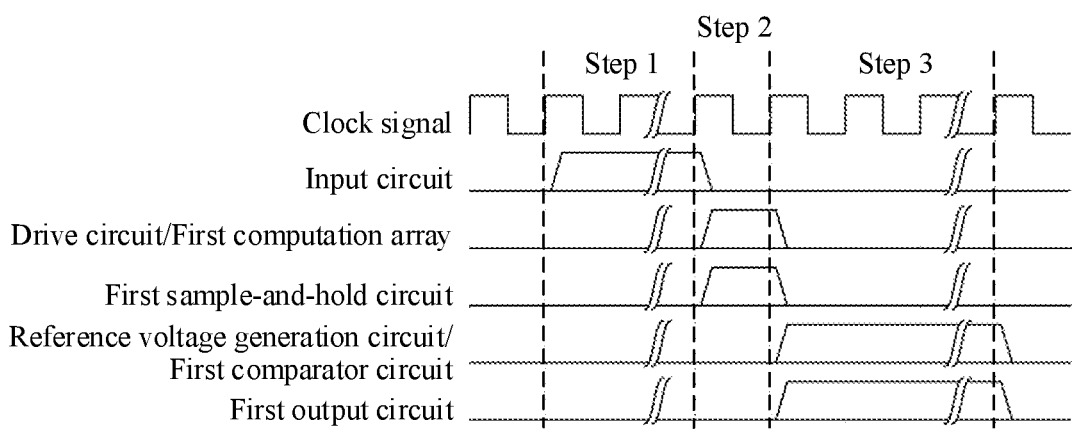
FIG. 5 is a schematic diagram of an operating time sequence of a neural network circuit according to this application.

FIG. 5 shows an operating time sequence of each circuit in the neural network circuit 300.

A precision requirement of the neural network varies with a magnitude of the current output by the first group of computation units. A larger current output by the first group of computation units requires higher precision of the neural network. The parameter adjustment circuit 304 may improve precision of the first computation result based on the control signal by increasing a sampling frequency of the first output circuit 308 and extending duration of the first level signal, to meet the precision requirement of the neural network.

For example, when the precision requirement of the neural network changes from computation precision A to computation precision B (where the computation precision B is higher than the computation precision A), the parameter adjustment circuit 304 may generate a control signal X1 and a control signal X2 based on the computation precision B. The control signal X1 controls the reference voltage generation circuit 306 to generate a reference voltage, so that the first comparator circuit 307 generates a voltage signal with longer duration after comparing the first analog voltage with the reference voltage. In this way, the first output circuit 308 can sample more information. The control signal X2 may control the first output circuit 308 to increase the sampling frequency, and sample more information per unit time.

For another example, when the precision requirement of the neural network changes from computation precision A to computation precision C (where the computation precision C is lower than the computation precision A), the parameter adjustment circuit 304 may generate a control signal X3 and a control signal X4 based on the computation precision C. The control signal X3 controls the reference voltage generation circuit 306 to generate a reference voltage, so that the first comparator circuit 307 generates a voltage signal with shorter duration after comparing the first analog voltage with the reference voltage. In this way, power consumption of the neural network circuit 300 can be reduced on the premise that sufficient information is sampled by the first output circuit 308. The control signal X4 controls the first output circuit 308 to reduce the sampling frequency. This reduces power consumption of the neural network circuit 300 while sufficient information is sampled per unit time.

Therefore, the neural network circuit 300 can adapt to a change in computation precision of the neural network. This avoids the following problems: A computation precision requirement cannot be met in a case of low precision, and a waste of power consumption is caused in a case of high precision.

Figure 6:
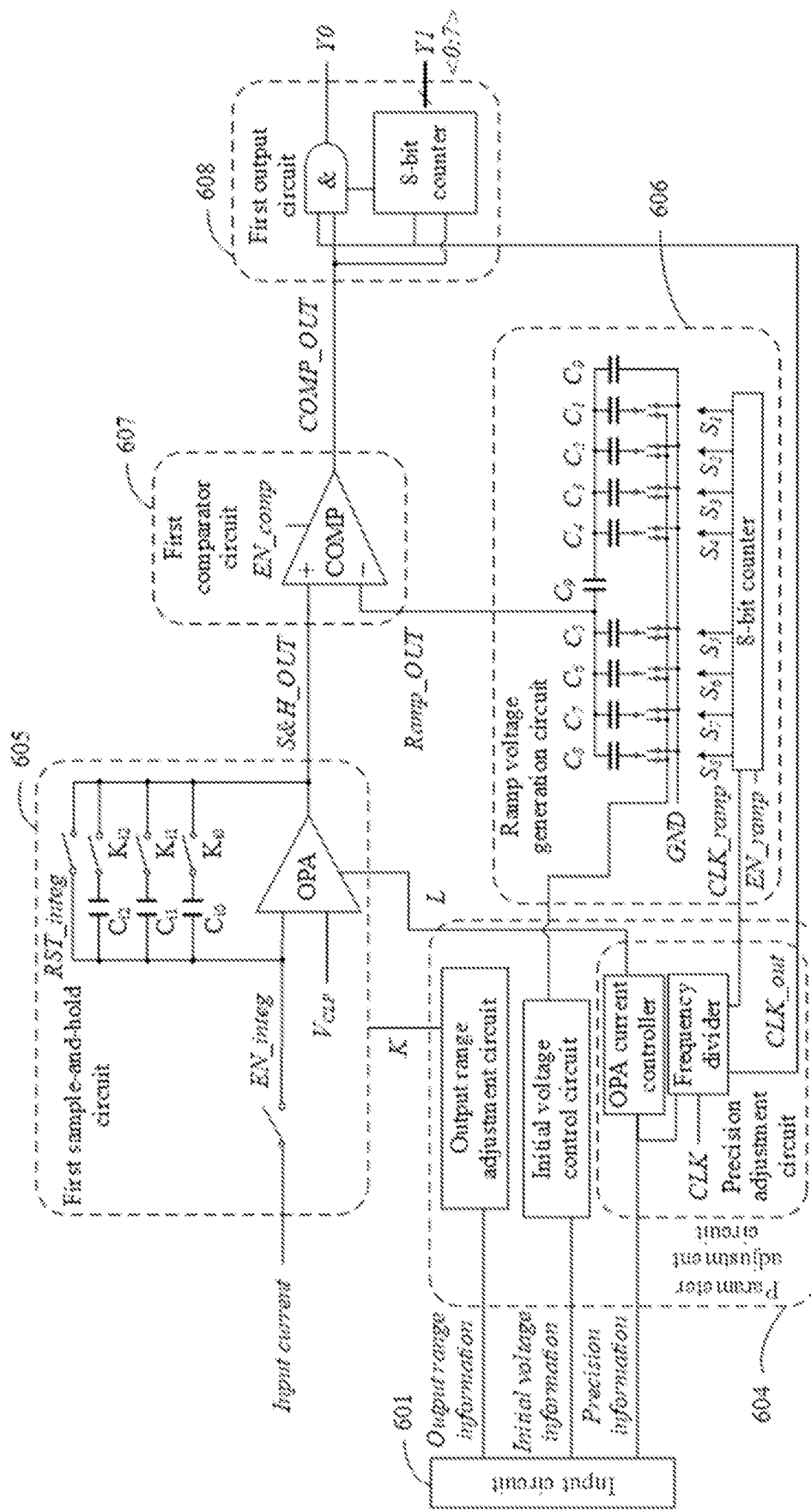
FIG. 6 is a schematic diagram of a structure of another neural network circuit according to this application.

FIG. 6 is a schematic diagram of an optional structure of the neural network circuit 300.

In FIG. 6, in addition to sending input data to a first computation array, an input circuit 601 further sends parameter control information to a parameter adjustment circuit 604, for example, output range information, initial voltage information, and precision information. The parameter adjustment circuit 604 includes various functional circuits, such as an output range adjustment circuit, an initial voltage control circuit, and a precision adjustment circuit.

The output range information is, for example, a quantity of rows enabled by the first computation array and an algorithm requirement. After obtaining the output range information from an output circuit, the output range adjustment circuit generates a control signal K that controls a switched capacitor. The control signal K is for controlling a switch group ($K_{i0}$, $K_{i1}$, and $K_{i2}$) in a first sample-and-hold circuit, and switches in the switch group are respectively connected to integration capacitors.

The first sample-and-hold circuit 605 may include an operational amplifier (OPA) and an integration capacitor. The integration capacitors are $C_{i0}$, $C_{i1}$, and $C_{i2}$ as in FIG. 6. The integration capacitor integrates an input current (that is, the first output current of the first computation array), and an output voltage of the integration capacitor is in a linear relationship with the input current, that is, S&H_OUT=A*Current_IN. S&H_OUT is an output voltage (a first analog voltage) of the first sample-and-hold circuit 605, Current_IN is an input current of the first sample-and-hold circuit 605, and A is a linear coefficient. When a switch in the switch group is closed and opened, capacitance of an integration capacitor of the first sample-and-hold circuit 605 changes. The integration capacitor controlled by the switch group may scale a ratio of an input current to an output voltage of the first sample-and-hold circuit 605. The linear coefficient A is a scaling multiple of the input current and the output voltage of the first sample-and-hold circuit 605.

The OPA can operate under a control signal L generated by the precision adjustment circuit. The control signal L is for controlling a reference current of the OPA, to reduce power consumption on a premise that a precision requirement on the output voltage of the first sample-and-hold circuit 605 is met. After the reference current decreases, a current of an amplifier of the OPA decreases under mirroring of a current mirror, reducing power consumption of the first sample-and-hold circuit 605.

In FIG. 6, RST_integ is a reset switch, EN_integ is an enable switch, and $V_{CLP}$ is a clamp voltage. These three features are all optional implementations.

The precision information described above is used by the parameter adjustment circuit 604 to generate control signals, for example, the control signal L generated by an OPA current controller and clock control signals (CLK_ramp and CLK_out) generated after a frequency divider (frequency divider) modulates a clock signal (CLK) of a neural network system. The OPA current controller and the frequency divider may be referred to as precision adjustment modules. The function of the control signal L has been described above, and a function of the clock control signal is described in detail below.

The clock control signal K is for controlling a ramp voltage generated by a ramp voltage generation circuit 606. The ramp voltage generation circuit 606 is an example of the reference voltage generation circuit 306 described above. The ramp voltage output by the ramp voltage generation circuit 606 and the first analog voltage output by the first sample-and-hold circuit 605 are used by the first comparator circuit 607 to generate the first level signal.

An operating principle of the first comparator circuit 607 is as follows:

When the first analog voltage is higher than the ramp voltage, the first level signal is a high-level signal.

When the first analog voltage is lower than the ramp voltage, the first level signal is a low-level signal.

Figure 7:
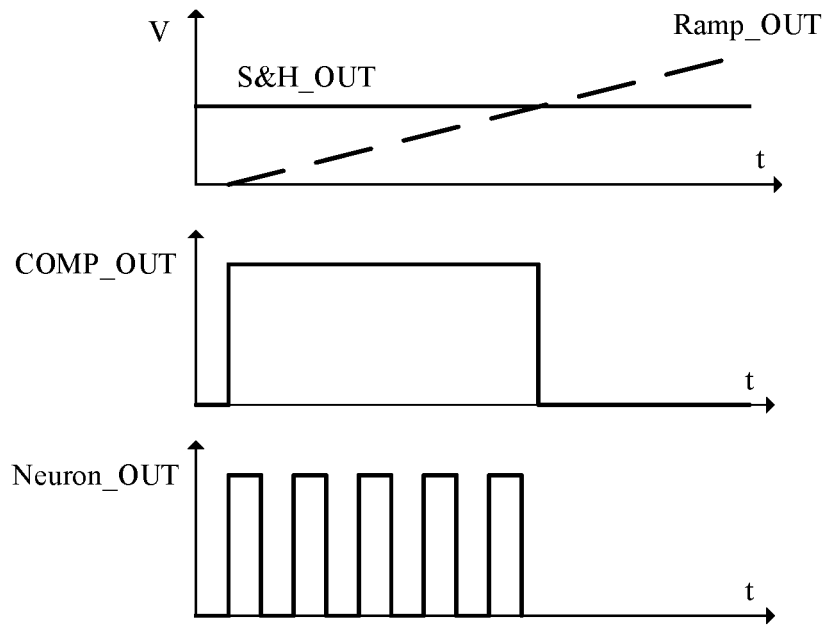
FIG. 7 is a schematic diagram of a level signal generation method according to this application.
Figure 8:
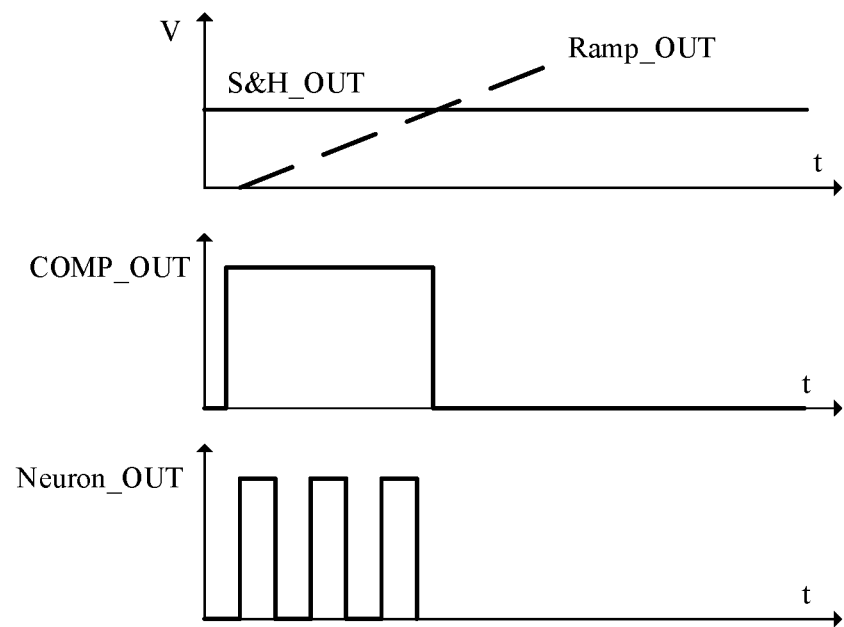
FIG. 8 is a schematic diagram of another level signal generation method according to this application.
Figure 9:
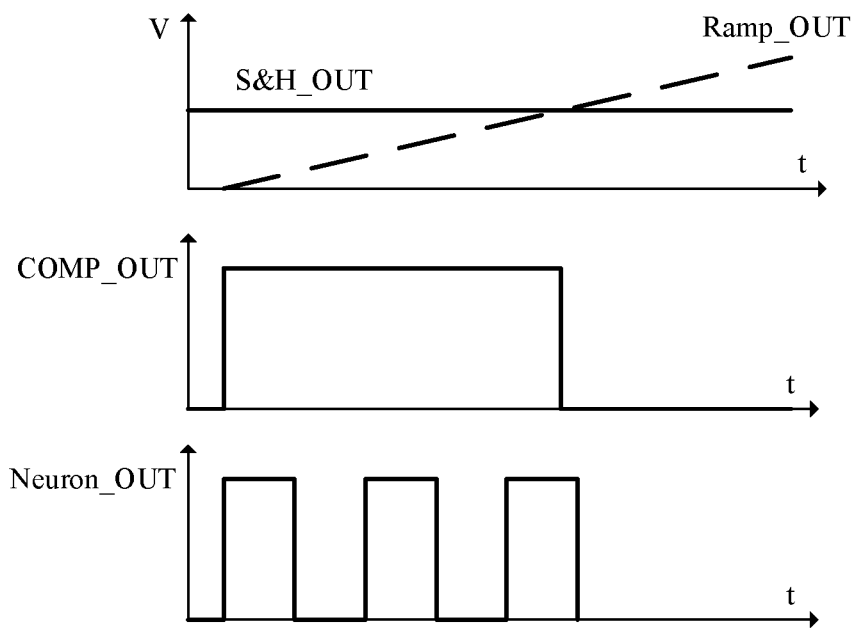
FIG. 9 is a schematic diagram of still another level signal generation method according to this application.

FIG. 7 to FIG. 9 are several examples in which the first comparator circuit generates a first level signal based on a ramp voltage and a first analog voltage. V represents a voltage, t represents time, S&H_OUT represents the first analog voltage output by the first sample-and-hold circuit 605, Ramp_OUT represents the ramp voltage output by the ramp voltage generation circuit 606, COMP_OUT represents the first level signal output by the first comparator circuit 607, and Neuron_OUT represents the first computation result obtained after a first output circuit 608 samples the first level signal. In FIG. 7 to FIG. 9, values of the first analog voltages are the same.

A slope of Ramp_OUT in FIG. 7 is less than a slope of Ramp_OUT in FIG. 8. When values of S&H_OUT are the same, duration of COMP_OUT in FIG. 7 is longer than duration of COMP_OUT in FIG. 8. When frequencies at which the first output circuit 608 samples COMP_OUT are the same, an information amount of Neuron_OUT in FIG. 7 is greater than an information amount of Neuron_OUT in FIG. 8. The slope of the ramp voltage is controlled by the clock control signal CLK_ramp. It can be learned that the parameter adjustment circuit 604 can control the output precision of the neural network circuit shown in FIG. 6. In addition, longer duration of the high-level signal leads to higher power consumption. Therefore, the parameter adjustment circuit 604 can further control the power consumption of the neural network circuit shown in FIG. 6 by controlling the slope of the ramp voltage.

The slope of Ramp_OUT in FIG. 7 is the same as a slope of Ramp_OUT in FIG. 9. Therefore, the duration of COMP_OUT in FIG. 7 is the same as duration of COMP_OUT in FIG. 9. A frequency in FIG. 7 at which the first output circuit 608 samples COMP_OUT is greater than the frequency in FIG. 9 at which the first output circuit 608 samples COMP_OUT. Therefore, an information amount of Neuron_OUT in FIG. 7 is greater than an information amount of Neuron_OUT in FIG. 9. The sampling frequency of the first output circuit 608 is controlled by the clock control signal CLK_out. It can be learned that the parameter adjustment circuit 604 can control the output precision of the neural network circuit shown in FIG. 6. In addition, a higher sampling frequency leads to higher power consumption. Therefore, the parameter adjustment circuit 604 can further control the power consumption of the neural network circuit shown in FIG. 6 by controlling the sampling frequency.

The parameter adjustment circuit 604 may control the output precision and the power consumption of the neural network circuit in FIG. 6 by using both CLK_ramp and CLK_out, or may control the output precision and the power consumption of the neural network circuit by using either CLK_ramp or CLK_out. The power consumption can be reduced on the premise of satisfying the output precision of the neural network circuit.

Optionally, in addition to controlling the output precision of the neural network circuit, the parameter adjustment circuit 604 may further control a sampling start time point of the first output circuit 608.

As shown in FIG. 6, after the initial voltage control circuit obtains the initial voltage information from the input circuit 601, the initial voltage control circuit outputs a voltage signal and applies it to a DAC of the ramp voltage generation circuit 606, to control an initial voltage of the ramp voltage. The DAC is a segmented switched-capacitor DAC and is configured to generate a ramp voltage. $C_0$ to $C_9$ are segmented switched-capacitors in the DAC, and $C_1$ to $C_9$ may be connected to the ground (GND) under control of switches. The ramp voltage generation circuit 606 further includes a counter. A bit width of the counter is, for example, 8 bits. 256 types of control signals may be output under control of CLK_ramp. As shown in S1 to S8, S1 to S8 are for controlling switches corresponding to $C_1$ to $C_9$, to adjust the slope of the ramp voltage.

Figure 10:
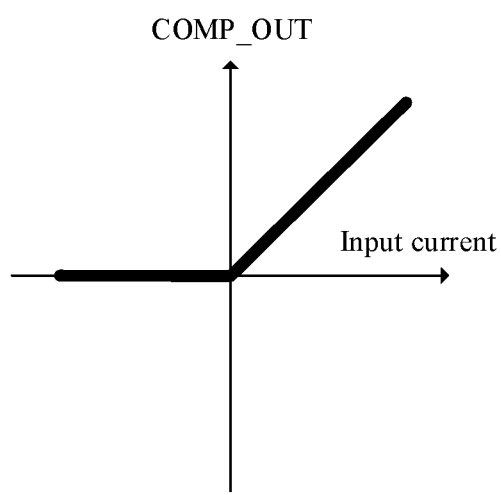
FIG. 10 is a schematic diagram of an output result of a comparator circuit according to this application.

When the initial voltage of the ramp voltage equals an initial voltage of the first analog voltage, the first comparator circuit 607 can output COMP_OUT in FIG. 10, that is, COMP_OUT maintains a ReLU functional relationship with an input current Current_IN of the first sample-and-hold circuit 605. The first comparator circuit 605 has a function of a ReLU function.

Figure 11:
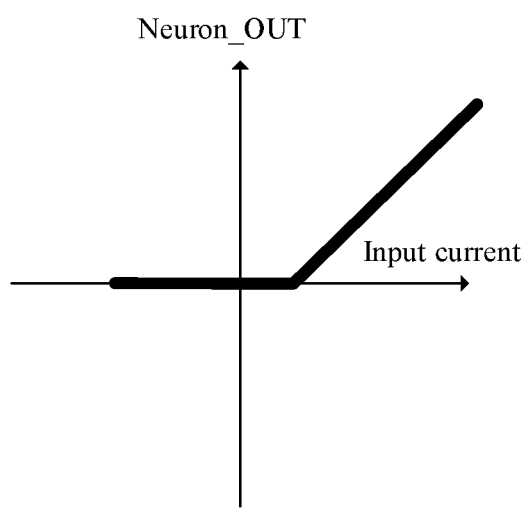
FIG. 11 is a schematic diagram of an output result of an output circuit according to this application.

When the first output circuit 608 delays the sampling start time point under the control of the parameter adjustment circuit 604, FIG. 11 shows a relationship between Neuron_OUT and Current_IN generated by the first output circuit 608, and a forward biased ReLU functional relationship is presented. The delay means that sampling starts after the control signal of the parameter adjustment circuit 604 is received, and sampling is not performed on the first level signal before the control signal. Optionally, the first output circuit 608 may further advance the sampling start time point under the control of the parameter adjustment circuit 604, so that Neuron_OUT and Current_IN present a reverse biased ReLU functional relationship.

The neural network circuit shown in FIG. 6 further includes the first output circuit 608. The first output circuit 608 can output two results: One is a data signal Y1 output by the counter, and the other is a pulse signal Y0. Y0 may be generated based on Y1. When the bit width of the counter is 8 bits, there may be eight precision choices for Y1, as <0:7> in FIG. 6.

Figure 13A:
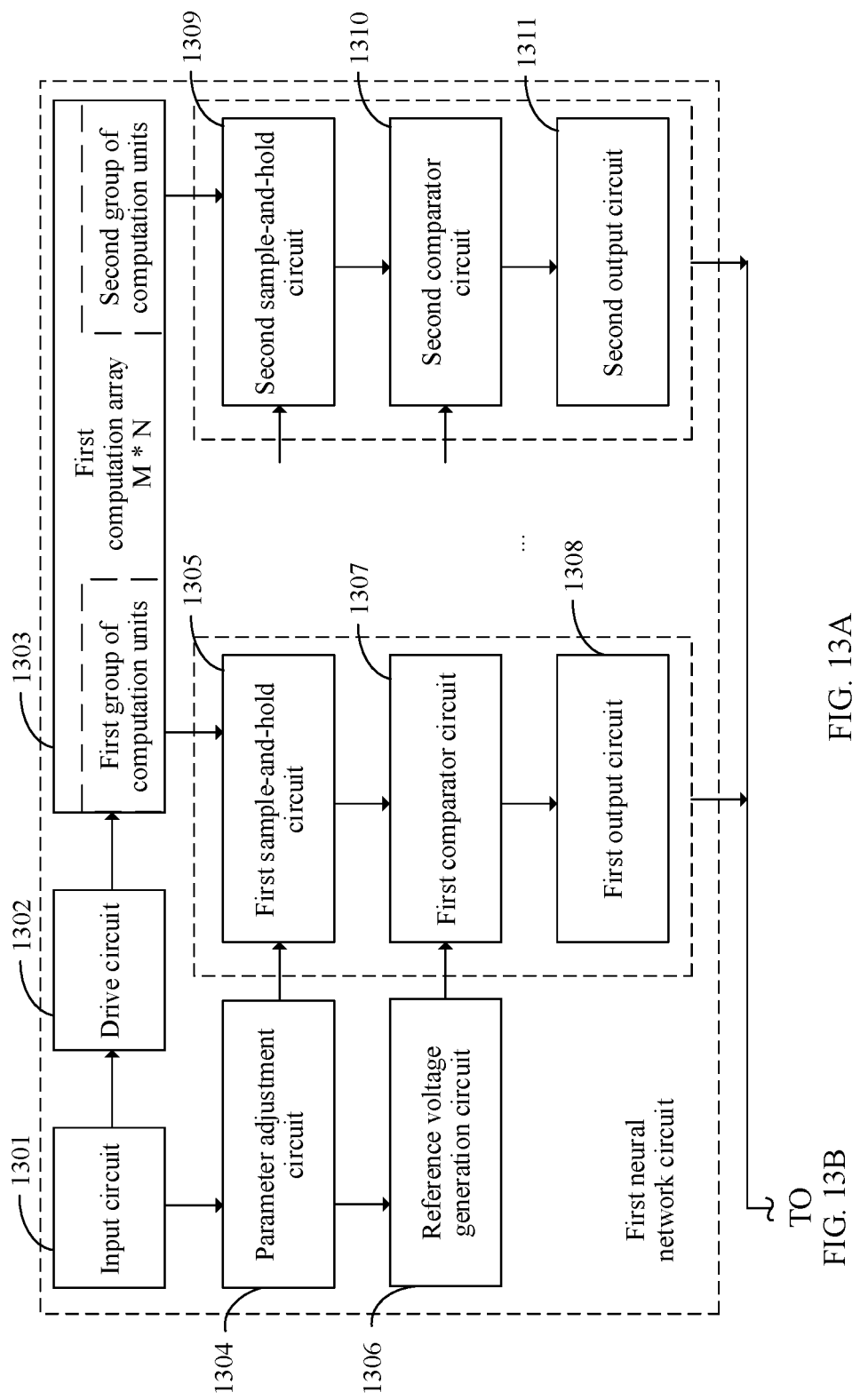
FIG. 13A and FIG. 13B are a schematic diagram of a structure of a neural network circuit applicable to a multilayer neural network according to this application.
Figure 13B:
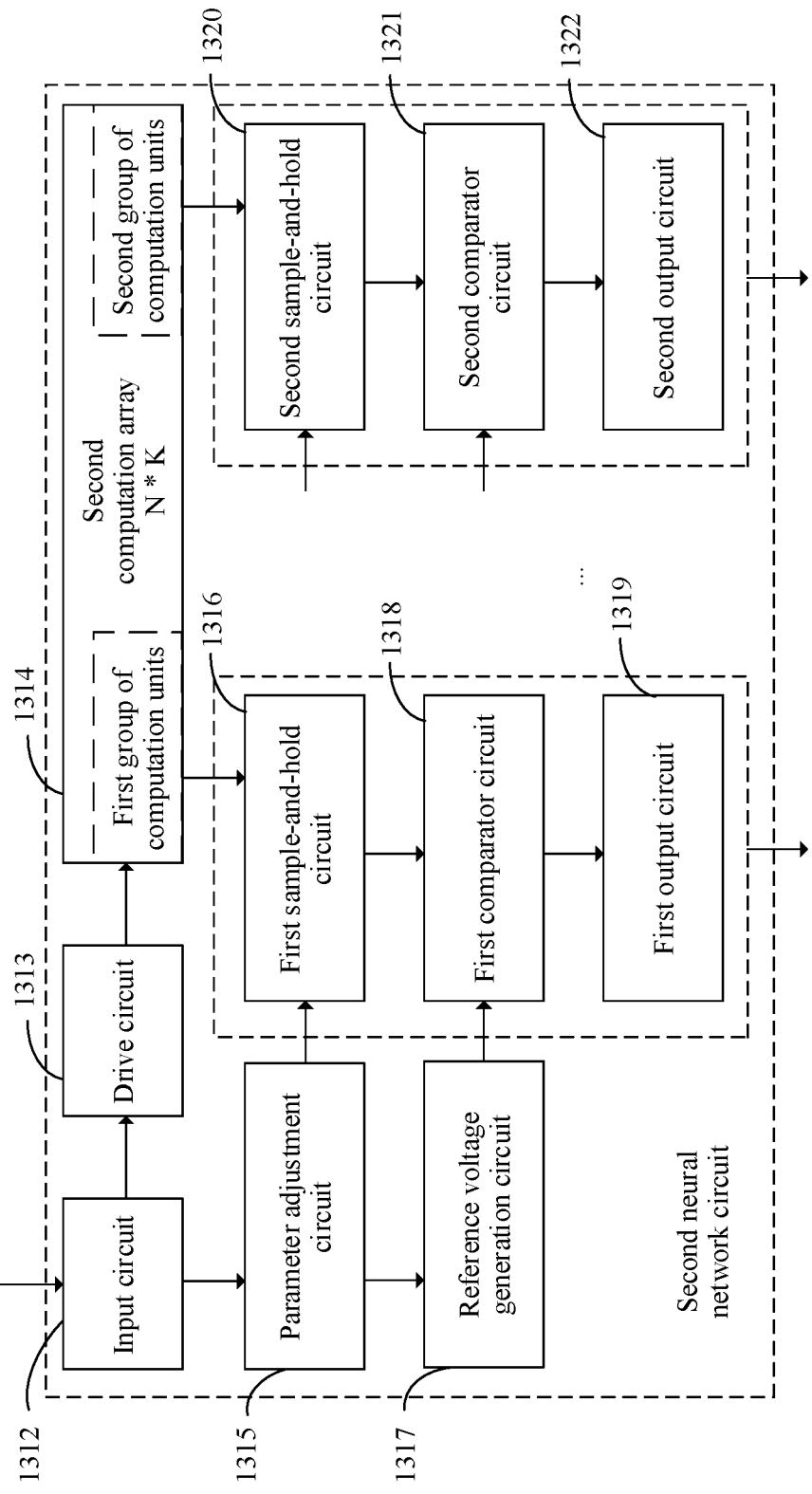

The input signal of the first computation array is usually a pulse signal. When a result output by the first output circuit 608 serves as an input signal of another computation array, the first output circuit 608 may output Y0. The result output by the first output circuit 608 can be used by the another computation array without conversion processing. Therefore, components such as a register and a shift accumulator are not needed. This reduces a quantity of components and power consumption required for conversion processing. FIG. 13A and FIG. 13B show this embodiment. When a first output circuit 1308 outputs Y0, Y0 may be directly loaded onto a second computation array 13114 by a drive circuit 1313 of a second neural network circuit. Therefore, an input circuit 1312 of the second neural network circuit in FIG. 13B is an optional module.

If the result output by the first output circuit 608 no longer serves as an input signal of another computation array, the first output circuit 608 may output YT.

The foregoing describes in detail a process in which the first computation array outputs one output current (that is, the first output current). When the first computation array may output a plurality of output currents, FIG. 12 shows a neural network circuit provided in this application.

Figure 12:
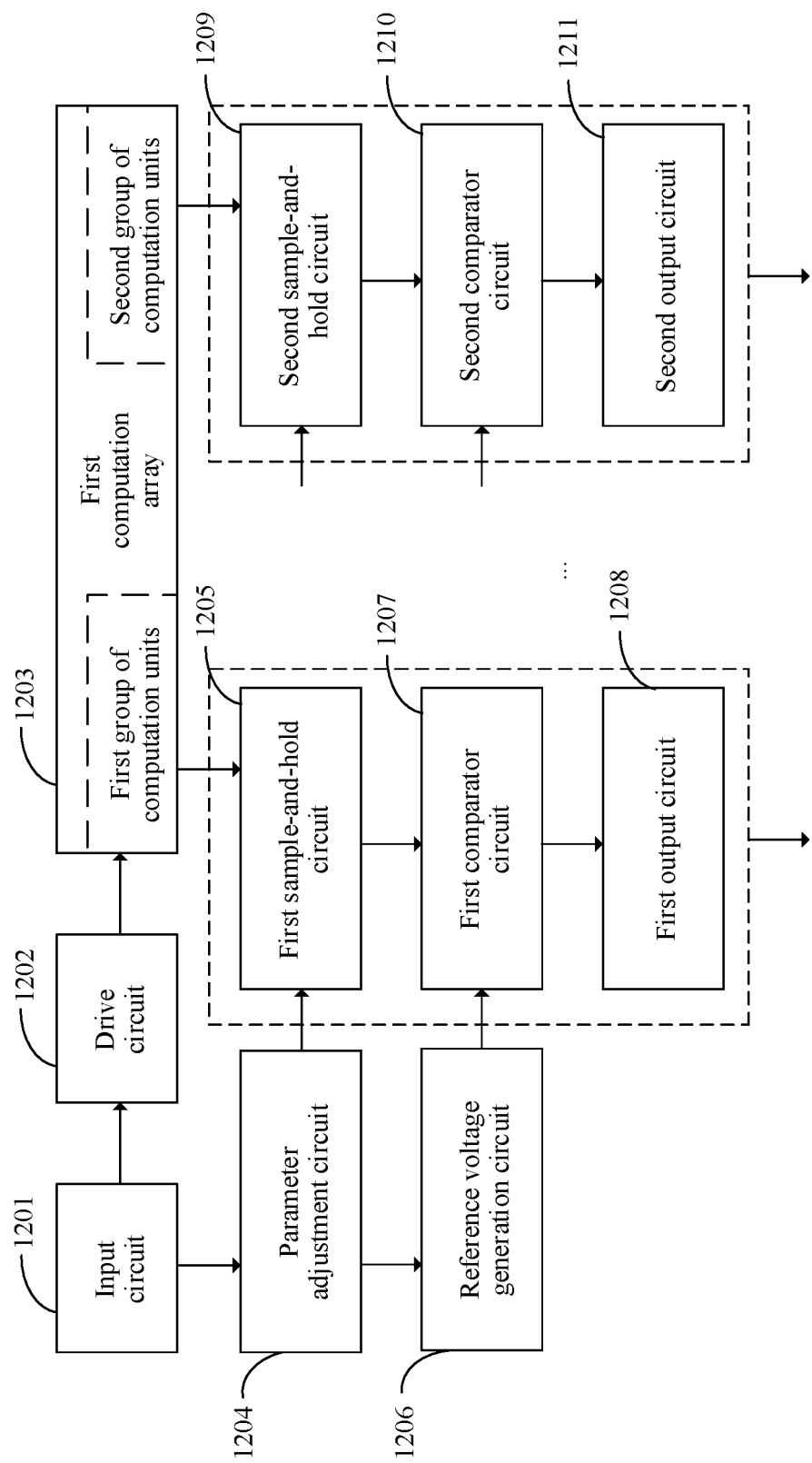
FIG. 12 is a schematic diagram of a structure of a neural network circuit including a plurality of groups of computation units according to this application.

In FIG. 12, a first computation array 1203 includes a plurality of groups of computation units, for example, a first group of computation units and a second group of computation units. The first group of computation units and the second group of computation units compute different input data based on weights, and output different output currents. The second group of computation units outputs a second output current to a second sample-and-hold circuit 1209. The second sample-and-hold circuit 1209 converts the second output current into a second analog voltage under control of a control signal L and a control signal K. A second comparator circuit 1210 outputs a second level signal based on the second analog voltage and a reference voltage (for example, a ramp voltage). A second output circuit 1211 samples the second level signal to generate a second computation result.

In FIG. 12, different groups of computation units in the first computation array 1203 use different sample-and-hold circuits, comparator circuits, and output circuits, and a parameter adjustment circuit 1204 and a reference voltage generation circuit 1206 are shared by all groups of computation units. This reduces a quantity of components and power consumption.

The neural network circuit shown in FIG. 12 is a circuit applicable to a single-layer neural network. Optionally, another circuit may be connected to the neural network circuit shown in FIG. 12, to meet a requirement of a multilayer neural network.

FIG. 13A and FIG. 13B are a schematic diagram of a circuit applicable to a multilayer neural network. A first neural network circuit is, for example, the circuit shown in FIG. 12. An input bit width of the first neural network circuit is M, a scale of a first computation array is M*N, and there are N output neurons (that is, N output circuits). An input bit width of a second neural network circuit is N, a scale of a second computation array is N*K, and there are K output neurons (that is, K output circuits). The output neurons of the second neural network circuit may further be connected to another neural network circuit.

Figure 14:
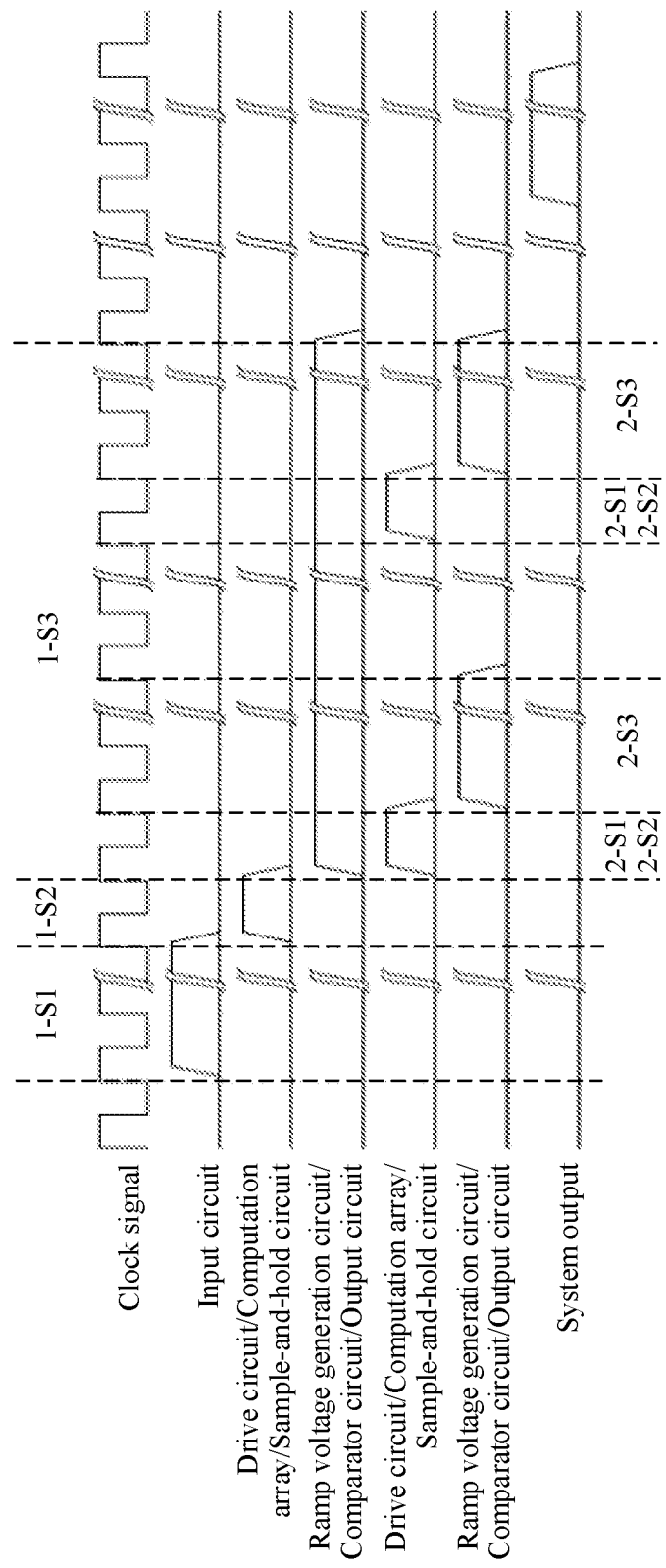
FIG. 14 is a schematic diagram of an operating time sequence of another neural network circuit according to this application.

FIG. 14 shows an operating time sequence of the circuit in FIG. 13A and FIG. 13B. When a reference voltage generation circuit, a comparator circuit, and an output circuit of the first neural network circuit operate, an input circuit, a drive circuit, a computation array, and a sample-and-hold circuit of the second neural network circuit also operate. An optional workflow is as follows:

1-S1: In a first step of the first neural network circuit, an input circuit 1301 of the first neural network circuit outputs input data in a rate-coding manner, where required time is determined by a data amount and a signal bit width.

1-S2: In a second step of the first neural network circuit, a drive circuit 1302, a first computation array 1303, and each sample-and-hold circuit of the first neural network circuit start to operate. The first computation array 1303 performs a multiply-add operation on the input data and weights stored in the first computation array 1303. An operation result is output after being processed by each sample-and-hold circuit.

1-S3: In a third step of the first neural network circuit, the reference voltage generation circuit 1306, each comparator circuit, and each output circuit start to operate, to output a first computation result.

2-S1: In a first step of the second neural network circuit, the input circuit 1312 of the second neural network circuit samples the first computation result of the first neural network circuit, and outputs a sampling result.

2-S2: In a second step of the second neural network circuit, the drive circuit 1313 of the second neural network converts the sampling result in the previous step into an analog voltage signal and applies it to a second computation array 1314. The second computation array 1314 performs a multiply-add operation on the input data and weights stored in the second computation array 1314. An operation result is output after being processed by each sample-and-hold circuit. Time of 1-S3, 2-S1, and 2-S2 coincide.

2-S3: In a third step of the second neural network circuit, a reference voltage generation circuit 1317, each comparator circuit, and each output circuit of the second neural network circuit start to operate, to output a second computation result.

Then, the neural network system outputs a final computation result.

In the circuit shown in FIG. 13A and FIG. 13B, precision of the first neural network circuit and the second neural network circuit may be represented by N1 and N2. The first neural network circuit may output $2^{N1}$ pulses, where each pulse serves as an input for the second neural network circuit. For each input, the second neural network circuit may output $2^{N2}$ pulses. Therefore, output precision of the second neural network circuit is (N1+N2) bits. For example, precision of each of ramp voltages of the first neural network circuit and the second neural network circuit is 8 bits. In this case, both N1 and N2 are 1-8 bits, and an output precision range of the second neural network circuit is 2-16 bits.

The foregoing describes in detail examples of the neural network circuit and the neural network system that are provided in this application. The neural network circuit and the neural network system each include a corresponding hardware structure and/or software module for performing each function. A person skilled in the art may be easily aware that this application can be implemented in a form of hardware or a combination of hardware and computer software with reference to the disclosed embodiments of this specification. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the several embodiments provided in this application, the disclosed system, apparatus and method may be implemented in other manners. For example, some features of the method embodiments described above may be ignored or not performed. The described apparatus embodiments are merely examples. Division into the units is merely logical function division and may be other division in actual implementation. A plurality of units or components may be combined or integrated into another system. In addition, coupling between the units or coupling between the components may be direct coupling or indirect coupling, and the coupling may include an electrical connection, a mechanical connection, or another form of connection.

It needs to be understood that sequence indexes of the foregoing processes do not mean execution sequences in the embodiments of this application. The execution sequences of the processes need to be determined based on functions and internal logic of the processes, and do not need to be construed as any limitation on the implementation processes of embodiments of this application.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A neural network circuit, comprising:
a drive circuit configured to convert digital input data into a voltage signal;
an input circuit configured to:
send the digital input data to the drive circuit, and
send, to a parameter adjustment circuit, precision information usable to control a first computation precision of an output of a neural network computation preformed on the input data;
a first neural network computation array, comprising a first group of computation units that is configured to perform the neural network computation, based on the voltage signal that represents the input data and pre-stored weights, to obtain a first output current;
a first sample-and-hold circuit configured to generate a first analog voltage based on the first output current;
the parameter adjustment circuit that is configured to generate a first control signal and a second control signal based on the precision information:
wherein the first control signal is configured to control a slope of a ramp voltage that controls a slope of a ramp voltage and thereby control duration of a first level signal, wherein the first control signal is configured to:
increase the first computation precision by decreasing the slope of the ramp voltage and thereby increase the duration of the first level signal,
decrease the first computation precision by increasing the slope of the ramp voltage and thereby decrease the duration of the first level signal; and
wherein the second control signal is configured to control a frequency at which a first output circuit samples the first level signal, wherein the second control signal is configured to:
increase the first computation precision by increasing the sampling frequency, and
decrease the first computation precision by decreasing the sampling frequency;
a ramp voltage generation circuit, configured to generate the ramp voltage based on the first control signal;
a first comparator circuit configured to output the first level signal based on a comparison between the first analog voltage and the ramp voltage; and
the first output circuit, configured to:
sample the first level signal based on the second control signal, and
output a first computation result as the output of the neural network computation,
wherein the first computation result is a computation result having the first computation precision, and
wherein the first computation precision is indicated by an information amount sampled by the first output circuit by sampling the first level signal.

2. The neural network circuit according to claim 1, wherein:
when the first analog voltage is higher than the reference voltage, the first level signal is a high-level signal; and
when the first analog voltage is lower than the reference voltage, the first level signal is a low-level signal.

3. The neural network circuit according to claim 1, further comprising a second neural network computation array, wherein the first output circuit is connected to an input end of the second neural network computation array,
wherein the second neural network computation array is configured to compute, based on weights and based on data input into the second neural network computation array, output data;
wherein the data input into the second neural network computation array comprises the first computation result, and
wherein the first computation result is a pulse signal.

4. The neural network circuit according to claim 1, wherein an initial voltage of the ramp voltage is controlled by the first control signal.

5. The neural network circuit according to claim 1, wherein the parameter adjustment circuit is further configured to generate a third control signal based on the first computation precision, and
wherein the third control signal is for controlling a reference current of an operational amplifier (OPA) in the first sample-and-hold circuit, to control precision of the first analog voltage and power consumption of the first sample-and-hold circuit.

6. The neural network circuit according to claim 1, wherein the parameter adjustment circuit is further configured to control a sampling start time point of the first output circuit.

7. A neural network system, comprising:
a neural network circuit, comprising:
a drive circuit configured to convert digital input data into a voltage signal;
an input circuit configured to:
send the digital input data to the drive circuit, and
send, to a parameter adjustment circuit, precision information usable to control a first computation precision of an output of a neural network computation preformed on the input data;
a first neural network computation array, comprising a first group of computation units that is configured to perform the neural network computation, based on the voltage signal that represents the input data and pre-stored weights, to obtain a first output current;
a first sample-and-hold circuit configured to generate a first analog voltage based on the first output current;
the parameter adjustment circuit that is configured to generate a first control signal and a second control signal based on the precision information:
wherein the first control signal is configured to control a slope of a ramp voltage that controls a slope of a ramp voltage and thereby control duration of a first level signal, wherein the first control signal is configured to:
increase the first computation precision by decreasing the slope of the ramp voltage and thereby increase the duration of the first level signal, decrease the first computation precision by increasing the slope of the ramp voltage and thereby decrease the duration of the first level signal; and wherein the second control signal is configured to control a frequency at which a first output circuit samples the first level signal, wherein the second control signal is configured to:
- increase the first computation precision by increasing the sampling frequency, and
- decrease the first computation precision by decreasing the sampling frequency;

a ramp voltage generation circuit, configured to generate the ramp voltage based on the first control signal;

a first comparator circuit configured to output the first level signal based on a comparison between the first analog voltage and the ramp voltage; and the first output circuit, configured to:
- sample the first level signal based on the second control signal, and
- output a first computation result as the output of the neural network computation, wherein the first computation result is a computation result having the first computation precision, and wherein the first computation precision is indicated by an information amount sampled by the first output circuit by sampling the first level signal;

wherein the neural network system further comprises:
a memory, configured to store input data; and
a processor, configured to:
- read the input data from the memory, and
- input the input data into the neural network circuit, so that the neural network circuit performs neural network computation on the input data.

8. The neural network system according to claim 7, wherein the memory is further configured to store a computer program; and the processor is further configured to invoke the computer program from the memory, to program a neural network computation array in the neural network circuit, wherein the programming is for configuring a weight of the neural network.

9. The neural network system according to claim 8, wherein an initial voltage of the ramp voltage is controlled by the first control signal.

10. The neural network system according to claim 8, wherein the parameter adjustment circuit is further configured to generate a third control signal based on the first computation precision, wherein the third control signal is for controlling a reference current of an operational amplifier (OPA) in the first sample-and-hold circuit, to control precision of the first analog voltage and power consumption of the first sample-and-hold circuit.

11. The neural network system according to claim 8, wherein the parameter adjustment circuit is further configured to control a sampling start time point of the first output circuit.

12. The neural network system according to claim 7, wherein:
- when the first analog voltage is higher than the reference voltage, the first level signal is a high-level signal; and
- when the first analog voltage is lower than the reference voltage, the first level signal is a low-level signal.

13. The neural network system according to claim 7, further comprising a second neural network computation array, wherein the first output circuit is connected to an input end of the second neural network computation array, wherein the second neural network computation array is configured to compute, based on weights and based on data input into the second neural network computation array, output data;

wherein the data input into the second neural network computation array comprises the first computation result, and wherein the first computation result is a pulse signal.

* * * * *